(12) United States Patent  
Day et al.

(10) Patent No.: US 7,607,370 B2
(45) Date of Patent: Oct. 27, 2009

(54) CRANK WITH CLUTCH AND COUPLER (75) Inventors: Franklin J. Day, 365 Pimlico Dr., Walnut Creek, CA (US) 94597-3671; Henry Molenda, Concord, CA (US)

(73) Assignee: Franklin J. Day, Walnut Creek, CA (US)

( * ) Notice: Subject to any disclaimer, the term of this patent is extended or adjusted under 35 U.S.C. 154(b) by 580 days.

(21) Appl. No.: 11/205,234

(22) Filed: Aug. 16, 2005

(65) Prior Publication Data

US 2007/0039412 A1   Feb. 22, 2007

(51) Int. Cl.
*B62M 3/00* (2006.01)
*F16H 27/02* (2006.01)
*F16H 31/00* (2006.01)
*F16D 21/02* (2006.01)
*F16D 11/04* (2006.01)

(52) U.S. Cl. .............. 74/594.1; 74/143; 192/48.6; 192/69.62; 192/114 R (58) Field of Classification Search ........... 192/48.6, 192/45, 64, 69.62, 43.2, 48.91, 114 R; 280/234, 280/242.1, 244, 250.1; 74/594.1–594.3, 74/30, 143; 242/261; 68/173; *B62M 3/00*
See application file for complete search history.

(56) References Cited

U.S. PATENT DOCUMENTS 1,433,259 A * 10/1922 Coffield ............... 68/173
2,130,581 A * 9/1938 Case ................. 242/261
3,198,304 A * 8/1965 Rosenblum .......... 192/48.6
3,515,250 A * 6/1970 Cantalupo ........... 192/48.91
3,994,509 A * 11/1976 Schaeffer ........... 280/250.1
4,303,255 A * 12/1981 Thomas .............. 280/234
5,322,312 A * 6/1994 Cammack ............ 280/244
5,390,773 A * 2/1995 Proia ................ 192/45

(Continued)

FOREIGN PATENT DOCUMENTS

JP   2000-43779     * 2/2000
WO   PCT/CH03/00340 * 12/2003

OTHER PUBLICATIONS

Smart Cranks—Nine (9) photographs of cranks, with unidirectional clutches and locking mechanisms in their hubs, that were publicly available at least as early as Jun. 1, 2005.

(Continued)

*Primary Examiner*—Vinh T. Luong
(74) *Attorney, Agent, or Firm*—Chernoff, Vilhauer, McClung & Stenzel, LLP (57) ABSTRACT

A crank including a mechanism capable of connecting the crank arm to a shaft to drive the shaft in rotation in either a unidirectional drive mode or a bidirectionally driving mode, the mechanism being quickly adjustable between modes. A coupler in the mechanism may be slidable between a first position engaging the crank arm with a hub portion fixedly mounted on the shaft and a second position in which a unidirectional clutch can operate to allow rotation of the crank arm freely about the shaft in one direction but cause rotation of the shaft in the opposition direction. The coupler may be arranged to be coupled only when the shaft is in a selected angular position.

24 Claims, 5 Drawing Sheets

U.S. PATENT DOCUMENTS

| | | | |
|---|---|---|---|
| 5,540,111 A * | 7/1996 | Barnett et al. | 74/30 |
| 5,860,329 A | 1/1999 | Day | |
| 6,705,443 B2 * | 3/2004 | Kettler et al. | 192/43.2 |
| 6,893,035 B2 * | 5/2005 | Watwood et al. | 280/242.1 |
| 2005/0173218 A1 * | 8/2005 | Walther et al. | 192/64 |
| 2006/0094569 A1 | 5/2006 | Day | |

OTHER PUBLICATIONS

Smart Cranks Installation, Maintenance, Training—four (4) pages of instructions downloaded from website www.smartcranks.com on Jun. 20, 2006, SmartCranks GmbH, Zug, Switzerland.

* cited by examiner

CRANK WITH CLUTCH AND COUPLER

BACKGROUND OF THE INVENTION

The present invention relates to cranks for use in human-powered machines such as bicycles and crank-driven exercise machines and relates particularly to such a crank equipped with a unidirectional clutch and a coupler engageable to prevent the clutch from permitting the crank to rotate in either direction with respect to the shaft.

It is known to connect cranks drivingly to crankshafts through unidirectional clutches in exercise machines and bicycles, as taught in Day U.S. Pat. No. 5,860,329. Use of such clutches is known as a way to assist in training a person's muscles. While pedals equipped with such clutches are useful, use of the clutches is not always desired, as it may be preferred at times to use a crank to move a shaft optionally in either rotational direction, particularly in exercise machines. It may also be desirable to use a unidirectional clutch for specific training purposes during a portion of a bicycle ride, but it also may be desirable to use the same bicycle with its cranks fixed to extend conventionally in opposite directions during a portion of the same bicycle ride. It would also be desirable to use a stationary exercise machine equipped with a crank or a pair of cranks driving an input crankshaft through unidirectional clutches at some times, yet to be able to have cranks fixed in a conventional oppositely-directed arrangement to drive the shaft optionally in either direction at other times, or to permit one crank to move the other one of a pair at times. The cost of two bicycles or two exercise machines equipped with differently connected cranks would usually not be justified, and the time required to exchange cranks equipped with clutches for cranks fixed to a crankshaft so as to rotate the crankshaft positively in either direction is also unacceptable.

What is desired, then, is a crank assembly that can be used to drive a crankshaft in either of two modes. In a first mode, a unidirectional clutch should permit free rotation of the crank in one direction with respect to the crankshaft, but couple the crank to the crankshaft drivingly when the crank is moved in an opposite rotational direction. In a second mode, the crank should be coupled drivingly to the shaft so as to drive the shaft in either direction, and the mechanism should be able to be shifted between the two modes simply and quickly.

SUMMARY OF THE INVENTION

In response to the above-mentioned desire the present invention provides a crank including an associated mechanism through which an arm of the crank can be connected drivingly to a crankshaft and can be used in a first mode to drive the crankshaft in one rotational direction, but to rotate freely about the crankshaft in the opposite rotational direction. The mechanism can be adjusted quickly and easily to couple the crank arm drivingly to the crankshaft, and thus permit use of the crank in a second mode in which rotation of the crank arm in either direction causes the crankshaft to rotate.

In one embodiment a coupler is carried movably on an inner end of the crank arm and is movable between an engaged or coupled position and a disengaged or uncoupled condition.

In one embodiment engagement of the coupler results in the crank arm being held in a predetermined angular position with respect to the crankshaft or a hub portion of the crank attached to the crankshaft.

The foregoing and other features of the invention will be more readily understood upon consideration of the following detailed description, taken in conjunction with the accompanying drawings.

DETAILED DESCRIPTION OF EMBODIMENTS

Referring now to the drawing figures which form a part of the disclosure herein, in FIG. 1 a crank assembly 10 which is one embodiment of the invention includes a crank arm 12, of a suitable material such as an aluminum alloy, that has a radially inner end 14 adapted to be attached to an end of a crankshaft as will be described in more detail presently, and an outer end 16. The crank arm 12 as shown herein is equipped with an array 18 of parallel grooves and ridges and a set of threaded bores 20, to accept adjustable attachment of a pedal at a selected location to provide a desired effective crank arm length, but it will be apparent that the crank could also be manufactured in a selected length with a conventional threaded bore (not shown) to accept a pedal or handle, depending upon the use to which the crank assembly 10 is intended to be put.

Figure 2:
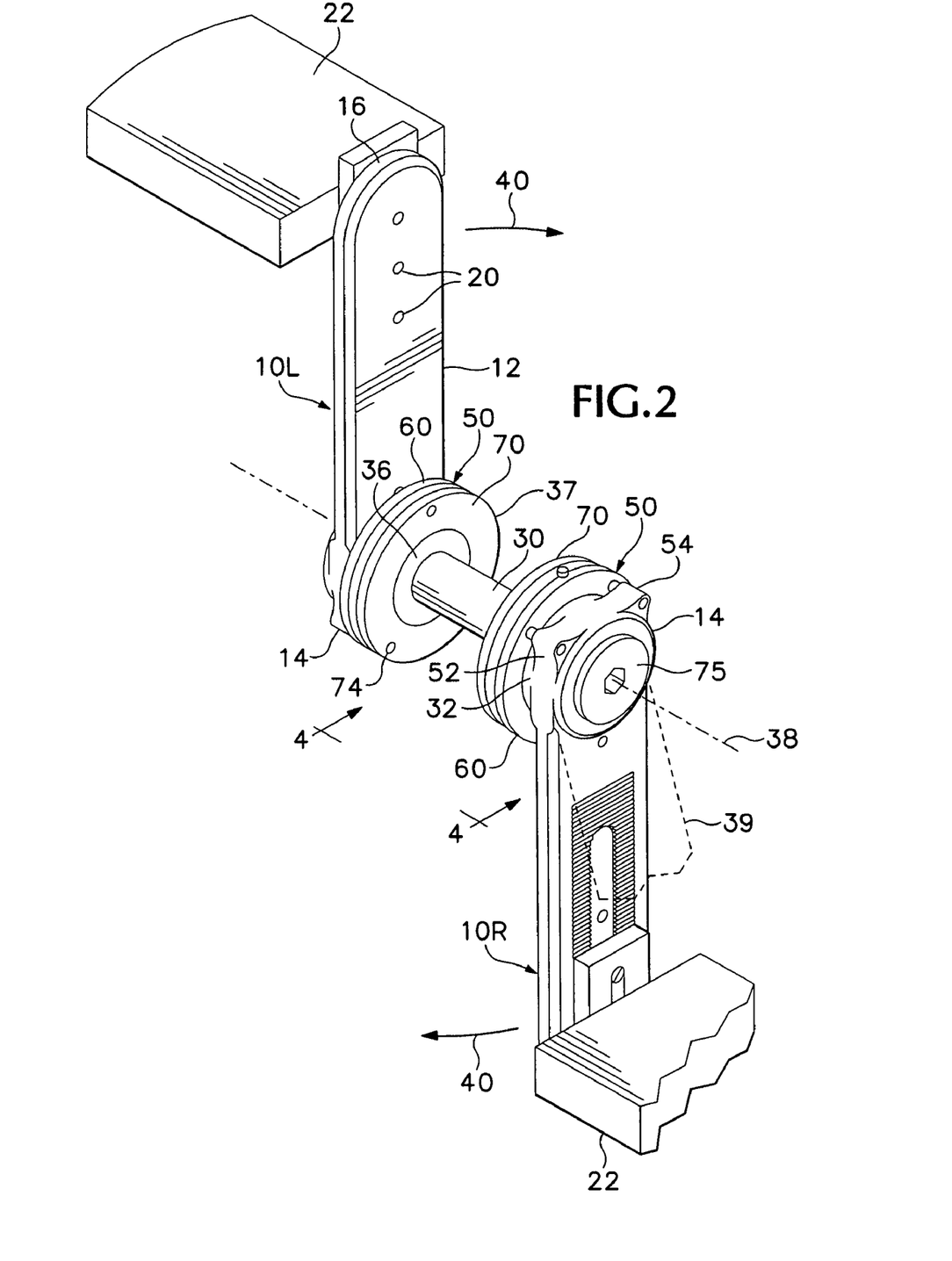
FIG. 2 is an isometric view of a crankset arrangement including pedals and crank arms mounted on a crankshaft.
Figure 3:
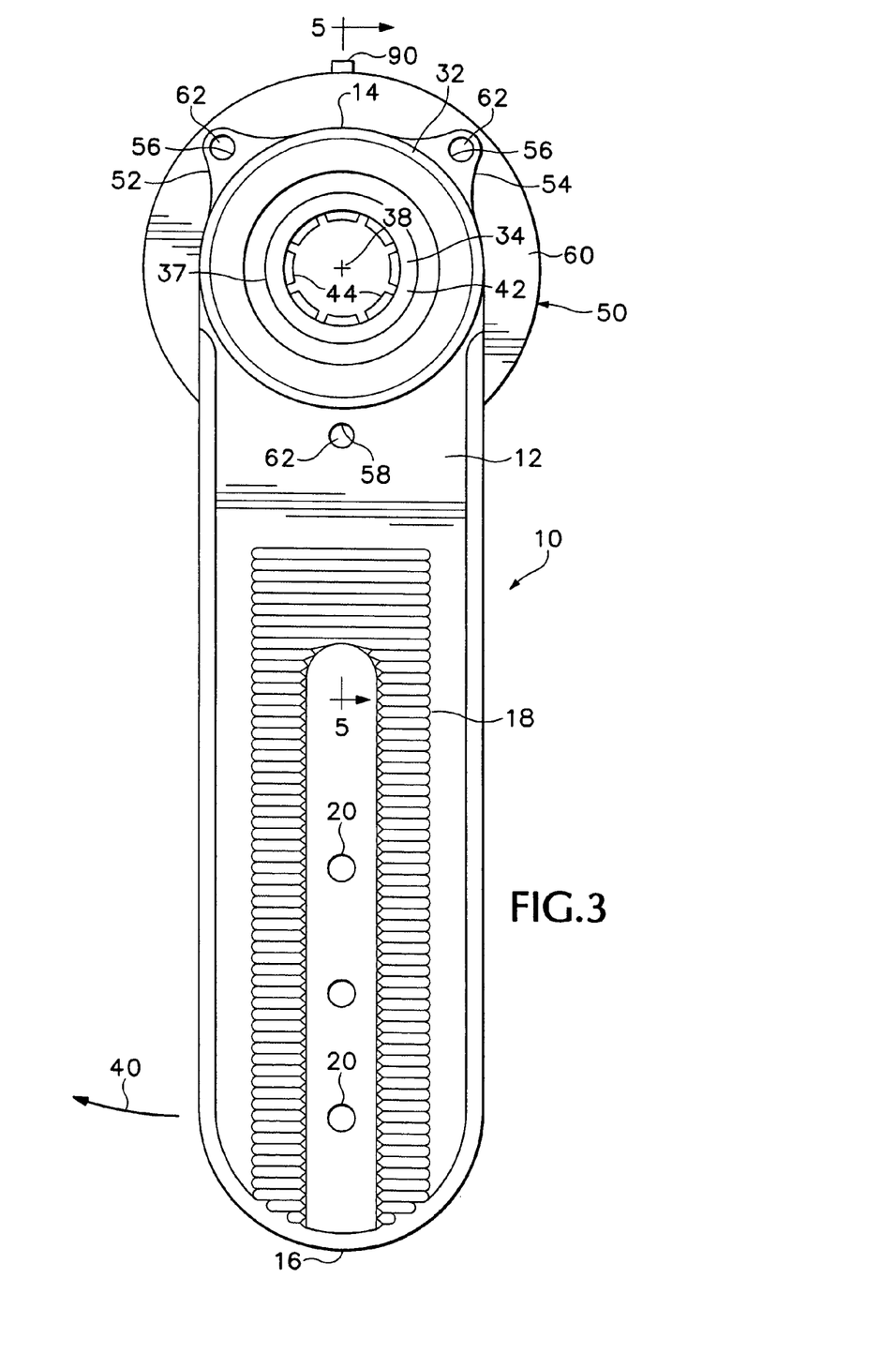
FIG. 3 is an elevational view of the crank assembly shown in FIG. 1, taken in an axial direction with respect to a shaft on which the crank assembly might be mounted.

As shown in FIG. 2, a pair of crank assemblies 10L and 10R are equipped with respective pedals 22, and each crank assembly 10L, 10R is attached to a respective one of a pair of opposite ends of a power input shaft, such as a crank shaft 30, shown in simplified form, without the supporting bearings that would be necessary, such as the bearings in the bottom bracket of a bicycle or an exercise machine.

It will be understood that depending upon the intended application of the crank assembly 10 various rotary drive mechanisms such as chain sprockets or drive belt pulleys not shown herein may be associated with the shaft 30 or either of the crank assemblies 10L and 10R.

The inner end 14 of the crank arm 12 includes a portion which serves as a clutch housing 32. A unidirectional clutch assembly 34 is fitted securely and tightly in the clutch housing portion 32, as by being pressed into a place. A spindle 36 fits matingly within the clutch assembly 34 as a part of a hub 37 arranged to be driven by the clutch assembly 34, and is made so that it can be fastened drivingly as an adaptor to mount the crank assembly 10 on an end of a shaft such as the crankshaft 30.

With the hub 37 attached drivingly to the crankshaft 30, the unidirectional clutch assembly 34 is engaged to drive the hub 37 and the crankshaft 30 when the crank arm 12 is moved in one rotational direction about the axis of rotation 38 of the crankshaft 30, such as direction indicated by the arrow 40. The clutch assembly 34 is disengaged when the crank arm 12 is moved about the axis 38 in the opposite direction, so that the crank arm 12 is moved about the axis 38 in the opposite direction so that the crank arm 12 is allowed by the clutch to rotate freely about the crankshaft 30, as to the position shown in broken line at 39, while the crankshaft 30 remains stationary.

It will be appreciated that the clutch assembly 34 in the crank assembly 10L shown in FIG. 2 is arranged so that it is engaged when the crank assembly 10L is rotated as indicated by the associated arrow 40 in FIG. 2.

The clutch assembly 34 is not shown herein in complete detail, but in one embodiment the outer portion 42 is a roller clutch mechanism securely mounted in the clutch housing 32, as by being pressed into place or by being inserted after heating the clutch housing 32, while the spindle 36 fits snugly within the outer portion 42 and includes a hardened smooth cylindrical outer surface about which the outer portion 42 can rotate freely in the direction opposite the arrow 40, but which is engaged drivingly by the outer portion 42 when it is rotated by the crank arm 12 moving in the direction indicated by the arrow 40. For use of a pair of crank assemblies 10 on a bicycle a preferred clutch assembly 34 is a roller clutch such as a Torrington® drawn cup roller clutch available from The Timken Company, of Canton, Ohio, and which drivingly engages the spindle 36 at any angular position of the outer portion 42 with respect to the spindle 36, in response to a very small angular movement, less than a degree of arc. Alternatively, for other applications of the crank assembly 10, other types of unidirectional clutches, such as those using ratchet-and-pawl combinations that can be engaged only at a finite number of discrete relative positions, may be satisfactory.

In each crank assembly 10 a coupler 50 is associated with the inner end 14 of the crank arm 12 to override the operability of the unidirectional clutch assembly 34 by selectively coupling the crank arm 12 drivingly to the hub 37. When the coupler 50 is coupled, rotation of the crank arm 12 about the axis 38, either in the direction indicated by the arrow 40 or in the opposite direction, will correspondingly rotate the crankshaft 30 to which the hub 37 is attached.

Referring now also to FIGS. 3, 4, 5, and 6, it will be seen that as part of the coupler 50 arrangement the inner end 14 of the crank arm 12 includes a pair of bosses 52 and 54 each defining a through-bore 56. A third through-bore 58 is defined in the crank arm 12, adjacent the clutch housing 32. The coupler 50 includes a collar 60 that carries three connecting pins 62, each of which is held fixedly in a respective hole in the collar 60 and extends slidably within respective one of the bores 56 and 58. As indicated by the arrow 66 the collar 60 is moveable in an axial direction, parallel with the axis of rotation 38 defined by the clutch assembly 34, between the coupled position shown in FIGS. 1, 2, and 5, and an unlocked position shown in FIG. 6. The connecting pins 62 and the bores 56 and 58 are all parallel with the axis of rotation 38 and each other, and thus when the collar 60 is moved axially it performs as a pin carrier, and the connecting pins 62 slide within but remain engaged in the bores 56 and 58, keeping the collar 60 from rotating with respect to the inner end 14 of the crank assembly 10.

It may be seen that in the crank assembly 10 as shown the outer surface of the clutch housing 32 at the inner end 14 of the crank assembly is generally cylindrical, and without the mating slidable relationship of the connecting pins 62 with the bores 56 and 58 the collar 60 might be rotatable about the clutch housing 32.

Figure 1:
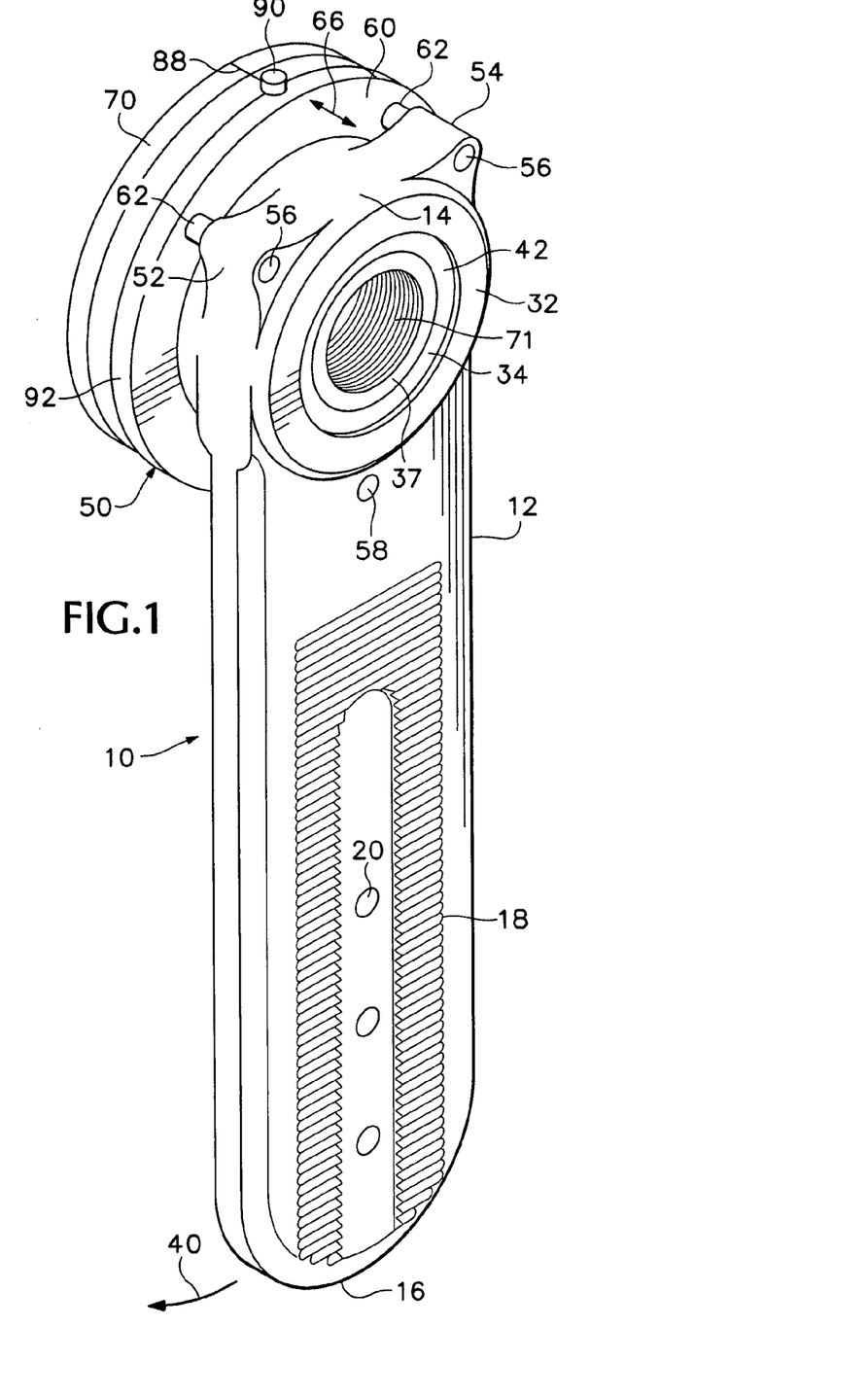
FIG. 1 is an isometric view showing a crank assembly including one embodiment of the present invention.

Instead of using the connecting pins 62 to prevent rotation of the collar 60 with respect to the clutch housing 32 the clutch housing 32 and collar 60 could be of other slidably mating non-circular shapes or might include mating slidable keys and key ways or be of a splined or fluted configuration permitting the collar 60 to be moved back and forth axially along the clutch housing 32 as indicated by the arrow 66 in FIG. 1. It will be appreciated, moreover, that the collar 60 could easily be removed from the crank assembly 10 if it is desired to use the unidirectioinal clutch without the option of overriding its function, thus reducing the weight of the crank assembly 10 slightly.

Figure 4:
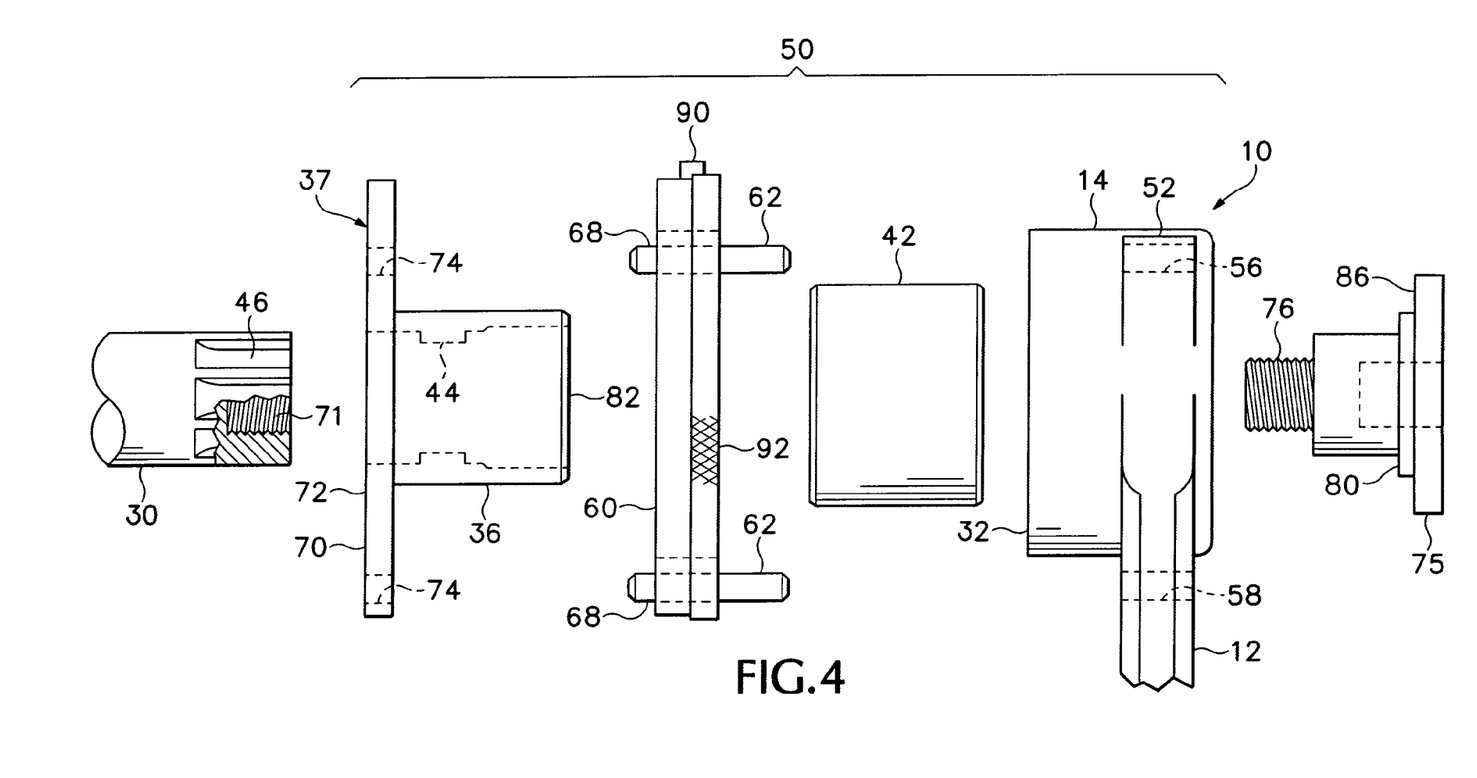
FIG. 4 is an exploded, partially cutaway view taken in the direction of line 4-4 in FIG. 2, showing the clutch and coupler mechanisms included in the crank assembly shown in FIG. 1, together with a portion of a shaft.

As may be seen in FIG. 4, each of the connecting pins 62 extends through the collar 60, and an end of each of the connecting pins protrudes as a projecting portion 68. The hub 37 includes a flange 70 securely and drivingly mounted to and extending radially outward about an inner end 72 of the spindle 36, and the flange 70 defines receptacles in the form of through-bores 74 located to receive matingly the projecting portions 68 of the connecting pins 62 when the collar 60 is in the coupled position shown in FIGS. 1 and 2.

The hub 37 as shown is provided with radially inwardly directed splines 44 to mate with corresponding grooves 46 formed in an end of a shaft, such as the crankshaft 30, to which the crank assembly 10 is to be attached, and the spindle 36 and flange 70 together thus constitute the hub 37 about which the crank arm 12 can rotate when the coupler 50 is uncoupled, and which acts to drive a shaft such as the shaft 30 to which it is attached. Internal threads 71 may be provided within the hub 37 for use in withdrawing the hub 37 from the end of a crankshaft 30.

It will be understood that instead of the spline and milled groove arrangement shown in FIG. 4 various other configurations of the end of a shaft might be used with corresponding internal shapes provided in the hub 37, such as conventional tapered square bicycle crankshaft ends or any of several other currently available configurations for a bicycle bottom bracket crankshaft. Conceivably, the spindle 36 could be machined as an integral part of a shaft or a half-shaft.

Figures 5, 6:
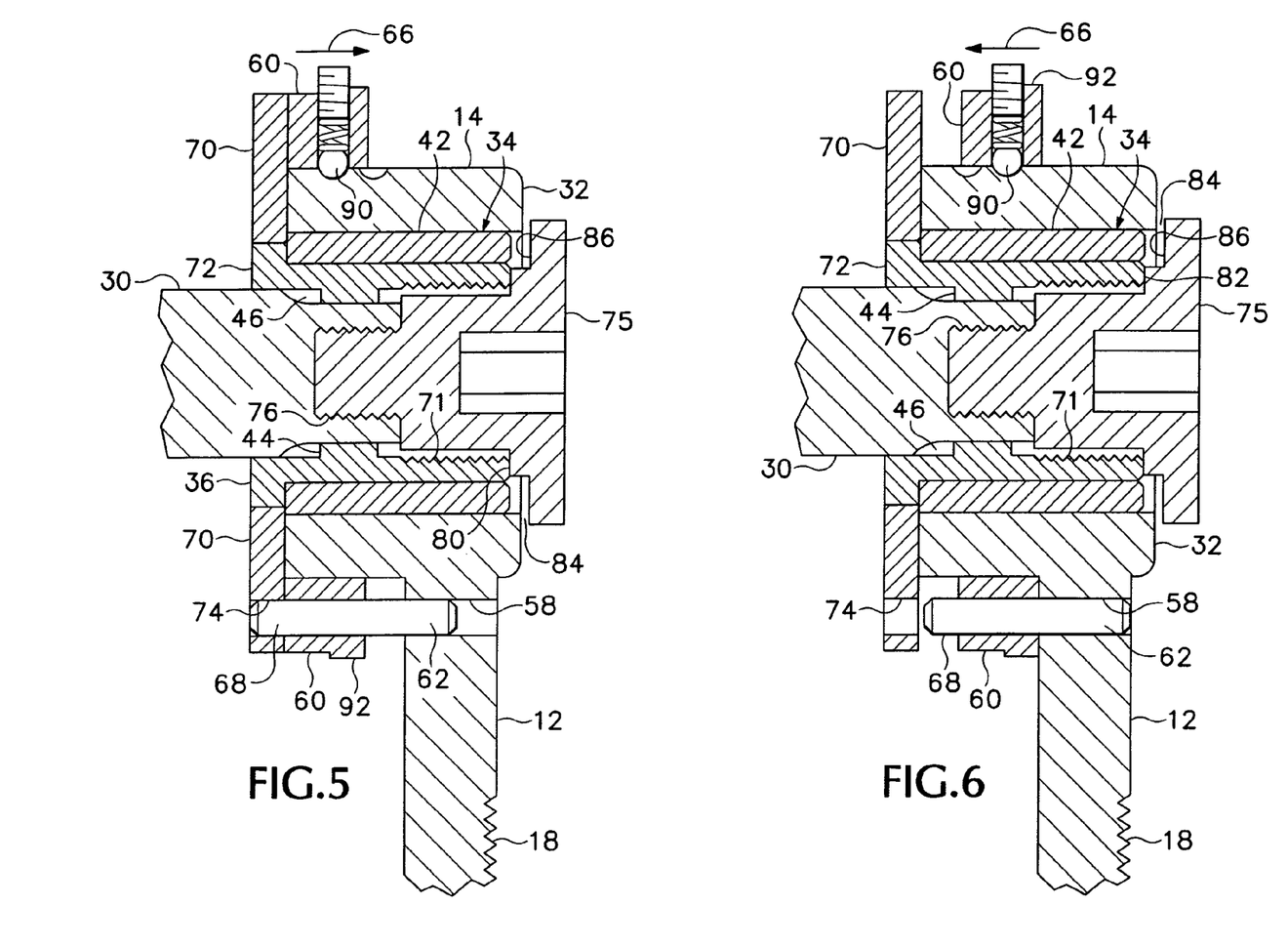
FIG. 5 is a sectional view of a portion of the crank assembly shown in FIG. 3, taken along line 5-5, at an enlarged scale, with the coupler engaged to override the unidirectional clutch.
FIG. 6 is a view similar to FIG. 5, but with the coupler disengaged, to permit the unidirectional clutch to function.

FIG. 5 shows that when the coupler 50 is in the coupled position the projecting portions 68 of the connecting pins 62 are mated in the receptacles 74, while the opposite end of each connecting pin 62 remains slidably engaged in a respective one of the bores 56 and 58, preventing the collar 60 from being rotated with respect to either the crank arm 12 or the flange 70. Since the flange 70 is fixedly mounted on the spindle 36 the coupler 50 thus couples the crank arm 12 to the hub 37.

Preferably the spline and groove arrangement includes a slightly tapered snug fit in order for the hub 37 to be fitted tightly to the end of a shaft such as the crankshaft 30. A special fastening bolt 75 includes a suitable drive socket and threads 76 that mate with an internal thread 78 in the end of the shaft 30. A radially extending shoulder 80 engages the outer end of the 82 of the hub 37 to keep it tightly fastened to the end of the shaft 30 as shown in FIGS. 5 and 6, while a small gap 84 is provided between the radially outwardly extending outer shoulder 86 of the bolt and the clutch assembly 34 and a surrounding portion of the clutch housing 32, to allow free rotation of the crank arm 12 with respect to the spindle 36 when the coupler 50 is uncoupled as shown in FIG. 6.

As may be seen best in FIGS. 2 and 4, the arrangement of the projecting parts 68 and the receptacles 74 may allow the coupler 50 to be coupled only in a unique position of rotation of the crank arm with respect to the flange 70, so that when the coupler 50 is coupled the crank arm 12 will be in a predetermined position with respect to the flange 70 and thus the hub 37. To assist in placing the crank arm 12 in the correct position for placement of the coupler 50 in the coupled condition, indicia such as a scored line 88 shown in FIG. 1 may be provided on the flange 70 and the collar 60.

Preferably a fastener or a detent such as a ball and spring detent 90 is provided in the collar 60 to hold the coupler 50 in the desired one of the coupled and uncoupled positions, to avoid inadvertent uncoupling. While the collar 60 is easily gripped to move it from alongside the crank arm 12 to the coupled position, a portion 92 of the collar 60 may be slightly larger in diameter than the flange 70, may be knurled, or may have another easily grasped surface configuration to facilitate uncoupling the coupler 50 from the hub 37 to enable the clutch assembly 34 to control whether the crank arm 12 drives the hub 37.

The collar 60 could alternatively be mounted non-rotatably on the flange 70 and could carry projections to be selectively mated with or removed from a mating relationship with the inner end of the crank arm 12 if desired, but such an arrangement might prove disadvantageous if it included connecting pins sliding within bores in the flange 70, since the connecting pins might project beyond the inner side of the flange 70 and thus interfere with the frame of a bicycle or other machine on which such a crank assembly is used.

As an alternative to the collar 60 and sliding pins 62 another mechanism capable of being coupled and uncoupled easily without tools could also be used to couple the clutch housing 32 to the flange 70. For example, a small pivoted lever arm (not shown) mounted on the crank arm 12 could selectively be engaged in a corresponding notch in the flange 70, or a catch could be slidably mounted on the crank arm 12 to engage such a notch in the flange 70 and thus couple the crank arm to the hub 37 so as to overcome the unidirectionial clutch assembly 34.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A crank assembly comprising:
a hub;
a crank arm having an inner end portion and an axis of rotation with respect to the hub;
a unidirectional clutch disposed drivingly between the crank arm and the hub; and
a coupler, at least a part of which is located between the hub and the crank arm, said coupler being mounted on said inner end portion and disposed for movement parallel with said axis of rotation, between a first, coupled, position engaged with the hub and interconnecting the crank arm with the hub and preventing rotation of the crank arm with respect to the hub, and a second, uncoupled, position disengaged from the hub, in which rotation of the crank arm about the axis of rotation with respect to the hub is controlled by the unidirectional clutch, said crank arm inner end portion including a clutch housing, and wherein said coupler includes a carrier engaged with said inner end portion adjacent said clutch housing so that said coupler is guided thereby and is required thereby to move parallel with said axis of rotation between said coupled position and said uncoupled position.

2. The crank assembly of claim 1 wherein said hub is attached drivingly to a crankshaft.

3. The crank assembly of claim 1 wherein said hub is incorporated in an end of a crankshaft.

4. The crank assembly of claim 1 wherein said hub is incorporated in an adaptor constructed to fit removably on and be secured drivingly to a bicycle bottom bracket crankshaft.

5. The crank assembly of claim 1 wherein said crank arm is held in a predetermined angular position with respect to said hub when said coupler is in said coupled position.

6. The crank assembly of claim 1 including a detent capable of holding the coupler in either the coupled position or the uncoupled position.

7. A crank assembly comprising:
(a) a hub defining a receptacle;
(b) a crank arm having an axis of rotation with respect to the hub and an inner end portion including a clutch housing;
(c) a unidirectional clutch disposed drivingly between the crank arm and the hub; and
(d) a coupler associated with the hub and the crank arm and mounted on said inner end portion of said crank arm for movement parallel with said axis of rotation, between a first, coupled, position interconnecting the crank arm with the hub and preventing rotation of the crank arm with respect to the hub, and a second, uncoupled, position in which rotation of the crank arm with respect to the hub is controlled by the unidirectional clutch, and wherein said inner end portion includes a clutch housing, and wherein said coupler includes a carrier engaged with said inner end portion so as to require said coupler to move parallel with said axis of rotation with respect to said clutch housing between said coupled position and said uncoupled position, said coupler including a projecting member mounted in said carrier, and said projecting member being drivingly mated in said receptacle, thereby preventing rotation of said crank arm about said axis with respect to said hub, when said coupler is in said coupled position.

8. The crank assembly of claim 7 wherein said coupler includes at least one driven part mounted on said carrier and engaged slidably with said inner end portion of said crank arm.

9. The crank assembly of claim 8 wherein said projecting member in said carrier and said receptacle in said hub are arranged so that said crank arm is in a predetermined position of rotation with respect to said hub when said coupler is in said coupled position.

10. A crank assembly comprising:
(a) a hub;
(b) a crank arm having an inner end portion and an axis of rotation with respect to the hub;
(c) a unidirectional clutch disposed drivingly between the crank arm and the hub; and
(d) a coupler associated with the hub and the crank arm and mounted on said crank arm for movement parallel with said axis of rotation, between a first, coupled, position interconnecting the crank arm with the hub and preventing rotation of the crank arm with respect to the hub, and a second, uncoupled, position in which rotation of the crank arm with respect to the hub is controlled by the unidirectional clutch, and wherein said crank arm inner end portion includes a clutch housing, and wherein said coupler includes a carrier engaged with said inner end portion adjacent said clutch housing so as to guide movement of said coupler and require said coupler to move parallel with said axis of rotation with respect to said clutch housing between said coupled position and said uncoupled position, said carrier having a plurality of connecting pins carried therein and extending therefrom into respective bores defined in said crank arm, said connecting pins being slidably disposed in said bores.

11. The crank assembly of claim 10 wherein at least one of said connecting pins extends through said carrier toward the hub and is matingly engaged in a respective receptacles in said hub, when said coupler is in said coupled position.

12. A crank-driven machine comprising:
(a) a power input shaft defining an axis of rotation; and
(b) at least one crank assembly associated drivingly with said power input shaft, the crank assembly including:
  (i) a hub drivingly attached to said shaft for rotation therewith;
  (ii) a crank arm having an inner end portion and that is mounted for rotation about said axis of rotation with respect to the hub;
  (iii) a unidirectional clutch disposed drivingly between the crank arm and the hub; and
  (iv) a coupler, at least a part of which is located between the hub and the crank arm and mounted on said inner end portion and disposed for movement parallel with said axis of rotation, between a first, coupled, position engaged with the hub and interconnecting the crank arm with the hub and preventing rotation of the crank arm with respect to the hub, and a second, uncoupled, position disengaged from the hub, in which rotation of the crank arm about the axis of rotation with respect to the hub is controlled by the unidirectional clutch, and wherein said crank arm inner end portion includes a clutch housing, and wherein said coupler includes a carrier engaged with said inner end portion adjacent said clutch housing so that said coupler is guided thereby and is required thereby to move parallel with said axis of rotation between said coupled position and said uncoupled position.

13. The machine of claim 12 including a pedal on said crank.

14. The machine of claim 12 including a pair of said crank assemblies on said shaft, the respective crank arms of said crank assemblies being oppositely directed when said coupler of each said crank assembly is in its coupled position.

15. The machine of claim 12 wherein said crank is held in a predetermined angular position with respect to said shaft when said coupler is in said coupled position.

16. The machine of claim 12 wherein said hub is incorporated in an end of said shaft.

17. The machine of claim 12 wherein said power input shaft is a bicycle bottom bracket crankshaft and said hub is incorporated in an adaptor constructed to fit on and be secured to said crankshaft.

18. The machine of claim 12 wherein said crank arm is held in a predetermined angular position with respect to said hub when said coupler is in said coupled position.

19. The machine of claim 12 wherein said crank assembly includes a detent capable of holding the coupler in either the coupled position or the uncoupled position.

20. A crank-driven machine comprising:
(a) a power input shaft defining an axis of rotation; and
(b) at least one crank assembly associated drivingly with said power input shaft, the crank assembly including:
  (i) a hub drivingly attached to said shaft for rotation therewith;
  (ii) a crank arm having an inner end portion and that is mounted for rotation about said axis of rotation with respect to the hub;
  (iii) a unidirectional clutch disposed drivingly between the crank arm and the hub; and
  (iv) a coupler associated with the hub and the crank arm and mounted on said inner end portion for movement parallel with said axis of rotation, between a first, coupled, position engaged with said hub and interconnecting the crank arm with the hub and preventing rotation of the crank arm with respect to the hub, and a second, uncoupled, position disengaged from the hub, in which rotation of the crank arm with respect to the hub is controlled by the unidirectional clutch, and wherein said crank arm inner end portion includes a clutch housing, and wherein said coupler includes a carrier engaged with said inner end portion adjacent said clutch housing so that said coupler is guided thereby and is required thereby to move parallel with said axis of rotation between said coupled position and said uncoupled position, and said coupler including a projecting member mounted in said carrier, and said hub defining a receptacle, said projecting member being drivingly mated in said receptacle, thereby preventing rotation of said crank arm about said axis with respect to said hub, when said coupler is in said coupled position.

21. The machine of claim 20 wherein said coupler includes at least one driven part mounted on said carrier and engaged slidably with said inner end portion of said crank arm.

22. The machine of claim 21 wherein said projecting member in said carrier and said receptacle in said hub are arranged so that said crank arm is in a predetermined position of rotation with respect to said hub when said coupler is in said coupled position.

23. A crank-driven machine comprising:
(a) a power input shaft defining an axis of rotation; and
(b) at least one crank assembly associated drivingly with said power input shaft, the crank assembly including:
  (i) a hub drivingly attached to said shaft for rotation therewith;
  (ii) a crank arm having an inner end portion and that is mounted for rotation about said axis of rotation with respect to the hub;
  (iii) a unidirectional clutch disposed drivingly between the crank arm and the hub; and
  (iv) a coupler associated with the hub and the crank arm and mounted on said inner end portion for movement parallel with said axis of rotation, between a first, coupled, position interconnecting the crank arm with the hub and preventing rotation of the crank arm with respect to the hub, and a second, uncoupled, position in which rotation of the crank arm with respect to the hub is controlled by the unidirectional clutch, and wherein said crank arm inner end portion includes a clutch housing, and wherein said coupler includes a carrier engaged with said inner end portion adjacent said clutch housing so that said coupler is guided thereby and is required thereby to move parallel with said axis of rotation between said coupled position and said uncoupled position, and wherein said carrier has a plurality of connecting pins carried therein and extending therefrom into respective bores defined in said crank arm, said connecting pins being slidably disposed in said bores.

24. The machine of claim 23 wherein at least one of said connecting pins extends through said pin carrier toward the hub and is matingly engaged in a respective receptacles in said hub, when said connector is in said coupled position.

* * * * *